(12) United States Patent
Hall et al.

(10) Patent No.: US 8,130,773 B2
(45) Date of Patent: Mar. 6, 2012

(54) HYBRID TOPOLOGY ETHERNET ARCHITECTURE

(75) Inventors: Brendan Hall, Eden Prairie, MN (US);
Michael Paulitsch, Riemerling (DE);
Dwayne (Dewey) Benson, Chandler, AZ (US); Phil Rose, Tucson, AZ (US);
Kevin R. Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 295 days.

(21) Appl. No.: 12/407,710

(22) Filed: Mar. 19, 2009

(65) Prior Publication Data
US 2009/0323704 A1 Dec. 31, 2009

Related U.S. Application Data

(60) Provisional application No. 61/075,672, filed on Jun. 25, 2008.

(51) Int. Cl.
*H04L 12/28* (2006.01)
*H04L 12/56* (2006.01)
*G06F 15/16* (2006.01)
*G06G 7/66* (2006.01)

(52) U.S. Cl. ........ 370/401; 370/216; 370/237; 370/241; 370/242; 370/256; 370/328; 370/349; 709/217; 709/225; 709/226; 709/239; 709/243; 701/115; 701/48; 701/102

(58) Field of Classification Search .......... 370/242–503; 709/217–245; 701/29, 33, 48, 101, 102, 701/115, 330
See application file for complete search history.

(56) References Cited

U.S. PATENT DOCUMENTS 5,396,357 A 3/1995 Goossen et al.
(Continued)

FOREIGN PATENT DOCUMENTS

EP 1058428 12/2000
(Continued)

OTHER PUBLICATIONS

Ademaj, Astrit and Hermann Kopetz, "Time-Triggered Ethernet and IEEE 1588 Clock Synchronization", "Precision Clock Synchronization for Measurement, Control and Communication, 2007. ISPCS 2007. IEEE International Symposium on", Oct. 1-3, 2007, pp. 41-43, Publisher: IEEE, Published in: Vienna.

(Continued)

*Primary Examiner* — Ayaz Sheikh
*Assistant Examiner* — Venkatesh Haliyur
(74) *Attorney, Agent, or Firm* — Fogg & Powers LLC

(57) ABSTRACT

A distributed control system comprises a first network section comprising one or more control nodes containing control logic operable to perform control function computations; a second network section, wherein the second network section comprises; a plurality of additional nodes responsive to the one or more control nodes in the first network section, each of the plurality of additional nodes communicatively coupled to two neighbor nodes and to two skip nodes using a plurality of links; first and second gateway interfaces each coupled to the first and second network sections and each operable to interface the first network section to the second network section; wherein the first network section is operable to communicate signals using a first communication protocol; and wherein the plurality of nodes in the second network section are operable to communicate signals over the plurality of links using a second communication protocol that is different from the first communication protocol.

19 Claims, 12 Drawing Sheets

U.S. PATENT DOCUMENTS

| | | | |
|---|---|---|---|
| 5,533,198 A * | 7/1996 | Thorson | 709/239 |
| 5,742,774 A | 4/1998 | Al-Salameh et al. | |
| 6,665,606 B2 | 12/2003 | Mathew et al. | |
| 6,801,942 B1 * | 10/2004 | Dietrich et al. | 709/225 |
| 7,046,638 B1 * | 5/2006 | Klausner et al. | 370/313 |
| 7,324,892 B2 * | 1/2008 | Fehr et al. | 701/115 |
| 7,372,859 B2 * | 5/2008 | Hall et al. | 370/400 |
| 7,457,249 B2 * | 11/2008 | Baldwin et al. | 370/237 |
| 7,483,778 B2 * | 1/2009 | Armbruster et al. | 701/48 |
| 7,502,334 B2 * | 3/2009 | Hall et al. | 370/258 |
| 7,505,470 B2 * | 3/2009 | Hall et al. | 370/400 |
| 7,593,344 B2 * | 9/2009 | Jordan et al. | 370/241 |
| 7,596,153 B2 * | 9/2009 | Paulitsch et al. | 370/503 |
| 7,606,179 B2 * | 10/2009 | Hall et al. | 370/258 |
| 7,649,835 B2 * | 1/2010 | Hall et al. | 370/216 |
| 7,653,765 B2 * | 1/2010 | Doyle et al. | 710/30 |
| 7,656,881 B2 * | 2/2010 | Hall et al. | 370/395.32 |
| 7,668,084 B2 * | 2/2010 | Driscoll et al. | 370/227 |
| 7,688,712 B2 * | 3/2010 | Glapin et al. | 370/216 |
| 7,729,297 B2 * | 6/2010 | Hall et al. | 370/258 |
| 7,733,841 B2 * | 6/2010 | Jordan et al. | 370/349 |
| 7,752,486 B2 * | 7/2010 | Satran et al. | 714/4.1 |
| 7,778,159 B2 * | 8/2010 | Driscoll et al. | 370/217 |
| 7,783,808 B2 * | 8/2010 | Hall et al. | 710/241 |
| 7,881,253 B2 * | 2/2011 | Budampati et al. | 370/328 |
| 7,889,683 B2 * | 2/2011 | Paulitsch et al. | 370/258 |
| 7,912,094 B2 * | 3/2011 | Hall et al. | 370/508 |
| 2003/0021226 A1 | 1/2003 | Mor | |
| 2004/0052450 A1 | 3/2004 | Morrison | |
| 2004/0054807 A1 * | 3/2004 | Harvey et al. | 709/243 |
| 2005/0049775 A1 | 3/2005 | Mooney | |
| 2005/0117596 A1 | 6/2005 | Kopetz | |
| 2005/0129038 A1 * | 6/2005 | Hall et al. | 370/404 |
| 2005/0135277 A1 * | 6/2005 | Hall et al. | 370/258 |
| 2005/0135278 A1 * | 6/2005 | Hall et al. | 370/258 |
| 2005/0152377 A1 * | 7/2005 | Hall et al. | 370/400 |
| 2005/0152379 A1 * | 7/2005 | Hall et al. | 370/400 |
| 2005/0198280 A1 * | 9/2005 | Hall et al. | 709/224 |
| 2008/0080551 A1 * | 4/2008 | Driscoll et al. | 370/465 |
| 2008/0089363 A1 * | 4/2008 | Paulitsch et al. | 370/503 |
| 2008/0098234 A1 * | 4/2008 | Driscoll et al. | 713/189 |
| 2008/0144526 A1 * | 6/2008 | Hall et al. | 370/254 |
| 2008/0205416 A1 | 8/2008 | DeChiara | |
| 2009/0086653 A1 * | 4/2009 | Driscoll et al. | 370/258 |
| 2009/0116502 A1 * | 5/2009 | Hall et al. | 370/406 |
| 2009/0122812 A1 * | 5/2009 | Steiner et al. | 370/503 |
| 2009/0323704 A1 * | 12/2009 | Hall et al. | 370/401 |
| 2010/0284301 A1 * | 11/2010 | Paulitsch et al. | 370/254 |

FOREIGN PATENT DOCUMENTS

| | | |
|---|---|---|
| EP | 1820103 A1 * | 8/2007 |
| EP | 1906599 | 4/2008 |
| WO | WO 2006063237 A1 * | 6/2006 |

OTHER PUBLICATIONS

"Full Authority Digital Engine Control Systems", "Available at http://www.tttech.com/fileadmin/content/pdf/TTTech-Honeywell-Casestudy-MAC.pdf", May 14, 2008, Publisher: TTTech.

Kopetz, Hermann et al., "The Time-Triggered Ethernet (TTE) Design", "Object-Oriented Real-Time Distributed Computing, 2005. ISORC 2005. Eighth IEEE International Symposium on", May 18-20, 2005, pp. 22-33, Publisher: IEEE.

McGovern, Janet, "Intelligent Sensor for Distributed Engine Control for Advanced Propulsion System Application", "Available at http://www.navysbir.com/n07_3/n073-175.htm", Aug. 20, 2007, Publisher: (SBIR) Navy.

"Concepts for Distributed Engine Control", "43rd Joint Propulsion Conference and Exhibit", Nov. 2007, pp. 1-19, Publisher: NASA.

Pfitzman, Andreas, "Networks Without User Observability", "Computers & Security", Apr. 2, 1986, pp. 158-166, vol. 6, No. 2, Published in: West Germany.

Pfitzmann, Andreas, "Research on anonymous communications in German(y) 1983-1990", "available at http://petworkshop.org/2004/talks/pfitza.pdf", Jun. 25, 2000, Published in: Dresden, Germany.

Steinhammer, Klaus et al., "A Time-Triggered Ethernet (TTE) Switch", "Design, Automation and Test in Europe, 2006. Date '06. Proceedings", Mar. 6-10, 2006, pp. 1-6, vol. 1.

European Patent Office, "European Search Report", Sep. 4, 2009, Published in: EP.

* cited by examiner

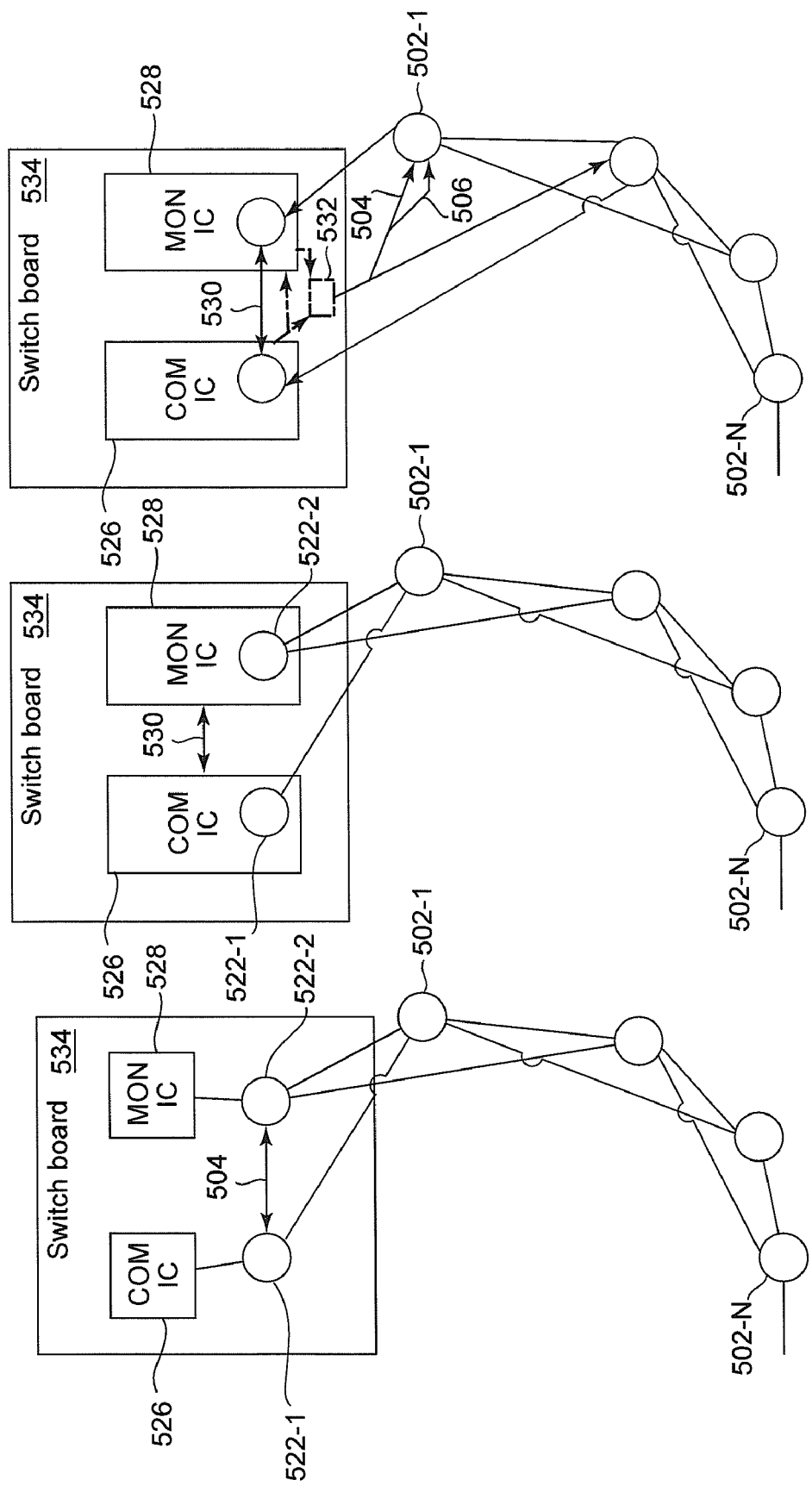

HYBRID TOPOLOGY ETHERNET ARCHITECTURE

CROSS-REFERENCE TO RELATED APPLICATIONS

The present application hereby claims the benefit of priority to U.S. provisional patent application Ser. No. 61/075,672, entitled "HYBRID TOPOLOGY ETHERNET ARCHITECTURE") filed on Jun. 25, 2008 (referred to herein as the '672 application). The '672 application is hereby incorporated herein by reference.

This application is related to the following co-pending U.S. patent applications, all of which are hereby incorporated herein by reference:

U.S. patent application Ser. No. 11/935,343 entitled "EFFICIENT TRIPLE MODULAR REDUNDANCY ON A BRAIDED RING") and filed on Nov. 5, 2007 (referred to herein as the '343 Application);

U.S. patent application Ser. No. 11/935,360 entitled "EMBEDDED SELF-CHECKING ASYNCHRONOUS PIPELINED ENFORCEMENT (ESCAPE)") and filed on Nov. 5, 2007 (referred to herein as the '360 Application);

U.S. patent application Ser. No. 11/537,305 entitled "SYSTEMS AND METHODS FOR FAULT-TOLERANT HIGH INTEGRITY DATA PROPAGATION USING A HALF-DULPEX BRAIDED RING NETWORK") and filed on Sep. 29, 2006 (referred to herein as the '305 Application);

U.S. patent application Ser. No. 10/993,936 entitled "SYNCHRONOUS MODE BROTHER'S KEEPER BUS GUARDIAN FOR A TDMA BASED NETWORK") and filed on Nov. 19, 2004 (referred to herein as the '936 Application);

U.S. patent application Ser. No. 10/993,933 entitled "HIGH INTEGRITY DATA PROPAGATION IN A BRAIDED RING") and filed on Nov. 19, 2004 (referred to herein as the '933 Application);

U.S. patent application Ser. No. 11/610,450 entitled "METHODS FOR EXPEDITED START-UP AND CLIQUE AGGREGATION USING SELF-CHECKING NODE PAIRS ON A RING NETWORK") and filed on Dec. 13, 2006 (referred to herein as the '450 Application);

U.S. patent application Ser. No. 10/993,931 entitled "ASYNCHRONOUS MODE BROTHER'S KEEPER BUS GUARDIAN FOR A RING NETWORK") and filed on Nov. 19, 2004 (referred to herein as the '931 Application);

U.S. patent application Ser. No. 11/010,249 entitled "SELF-CHECKING PAIR ON A BRAIDED RING NETWORK") and filed on Dec. 10, 2004 (referred to herein as the '249 Application); and U.S. patent application Ser. No. 11/945,037 entitled "DISTRIBUTED ENGINE CONTROL SYSTEM") and filed on Nov. 26, 2007 (referred to herein as the '037 Application).

BACKGROUND

Full Authority Digital Engine Control (FADEC), typically comprises a centralized controller with two independent channels to provide redundancy and improved availability. As 'Full Authority' implies, the operation of the engine is dependent on the proper operation of the controller. In current systems, the FADEC is often located on the relatively cool engine fan case to allow use of conventional electronics or is fuel cooled if located more centrally on the engine, the latter approach being more costly due to complexity of the controller enclosure.

Typical FADEC systems are optimized for a particular engine, which limits application-to-application re-use. Each new application is often a 'clean sheet' design. It also means that any obsolescence issues often have to be handled by a major redesign of the controller. New features can only be added during a major redesign effort. The many unique designs mean no commonality, costly spares provisioning, no recurring cost leverage, and limited opportunity for technology insertion. In addition, the extreme temperature environment on some parts of a jet engine and the lack of communications technology by which multiple suppliers can contribute engine components (for example, sensors, actuators, etc.) that are interoperable over a common bus interface contribute to the costs of typical implementations of a FADEC approach.

SUMMARY

In one embodiment, a distributed control system is provided. The distributed control system comprises a first network section comprising one or more control nodes containing control logic operable to perform control function computations; a second network section, wherein the second network section comprises; a plurality of additional nodes responsive to the one or more control nodes in the first network section, each of the plurality of additional nodes communicatively coupled to two neighbor nodes and to two skip nodes using a plurality of links; first and second gateway interfaces each coupled to the first and second network sections and each operable to interface the first network section to the second network section; wherein the first network section is operable to communicate signals using a first communication protocol; and wherein the plurality of nodes in the second network section are operable to communicate signals over the plurality of links using a second communication protocol that is different from the first communication protocol.

BRIEF DESCRIPTION OF THE DRAWINGS

Understanding that the drawings depict only exemplary embodiments of the present invention and are not therefore to be considered limiting in scope, the exemplary embodiments will be described with additional specificity and detail through the use of the accompanying drawings, in which:

FIGS. 5A-5C are diagrams of additional embodiments of exemplary configurations of gateway interfaces.

In accordance with common practice, the various described features are not drawn to scale but are drawn to emphasize specific features relevant to the present invention. Like reference numbers and designations in the various drawings indicate like elements.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made. The following description is, therefore, not to be taken in a limiting sense.

The embodiments described below provide dependability augmentation strategies that can be blended with a plurality of technologies to enable a Distributed Control System (DCS) which addresses the problems discussed above. The embodiments described below implement a Braided Ring Availability Integrity Network (BRAIN). The BRAIN is a guardian and dependability augmentation strategy that can be fused with any of a plurality of protocols. For example, protocols with which the BRAIN can be fused include, but are not limited to, Controller Area Network (CAN), TTP/C, FlexRay, Intellibus, IEEE-1394, SAE 5643, ARINC 664, and Ethernet-based technologies, such as Ethernet POWERLINK, EtherCAT, and Time-triggered (TT) Ethernet.

As used herein, Controller Area Network refers to an implementation of one or more of the family of ISO 11898/11519 families of standards. In addition, as used herein, FlexRay refers to an implementation of the network communications protocol developed by the FlexRay Consortium; and TTP/C refers to an implementation of the Time Triggered Protocol which conforms to the Society of Automotive Engineers (SAE) Class C fault tolerant requirements. Intellibus, as used herein, refers to an implementation of the network bus protocol developed by the Boeing Company. Discussion of Ethernet-based technologies herein refers to implementations of one or more of the family of IEEE 802.3 family of standards. In addition, EtherCAT, as used herein, also refers to an implementation of the specification published as IEC/PAS 62407. Similarly, Ethernet POWERLINK refers to an implementation of the protocol standard managed by the Ethernet POWERLINK Standardization Group.

Figure 1:
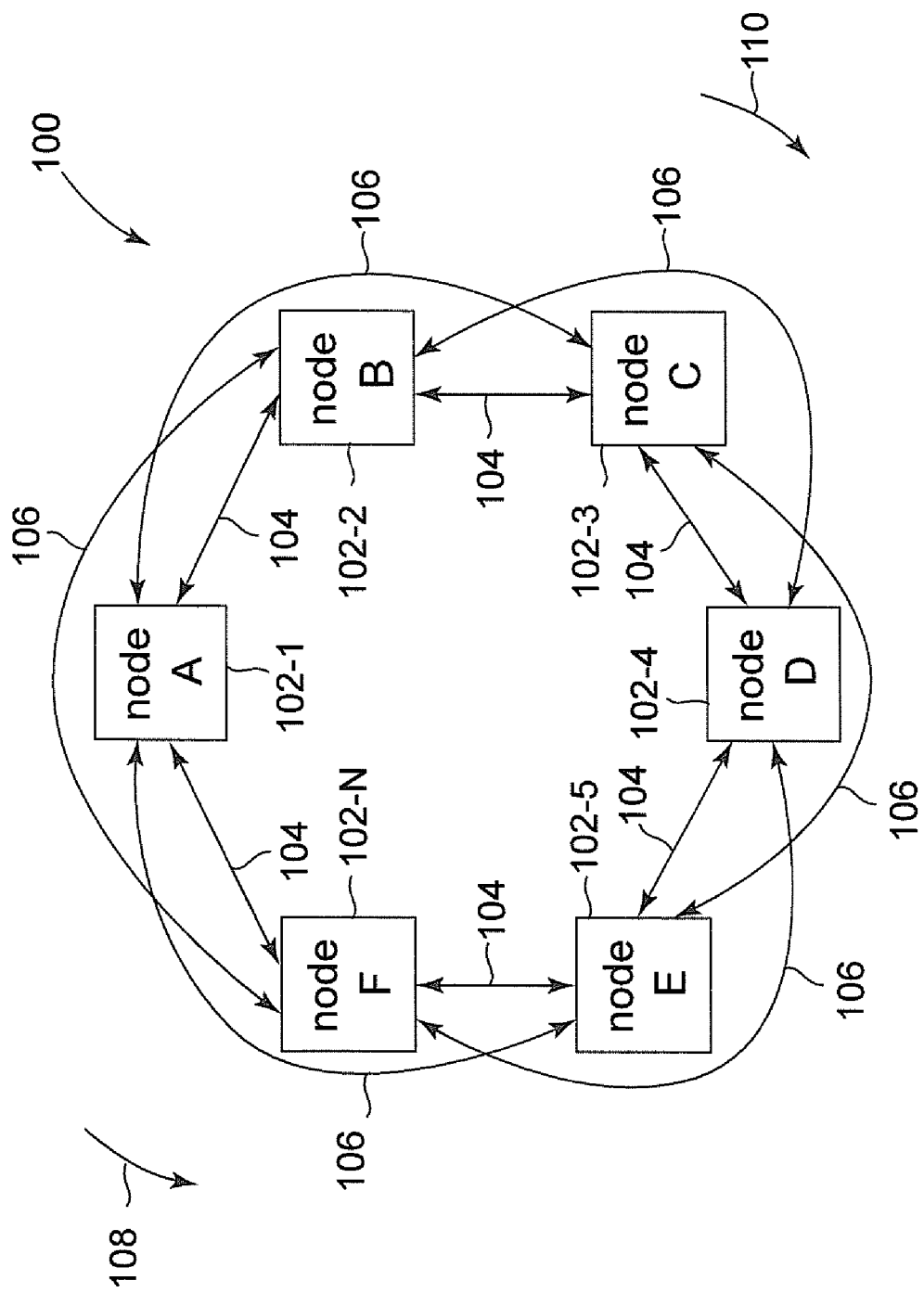
FIG. 1 is a block diagram of one embodiment of a braided-ring network topology.
Figure 2:
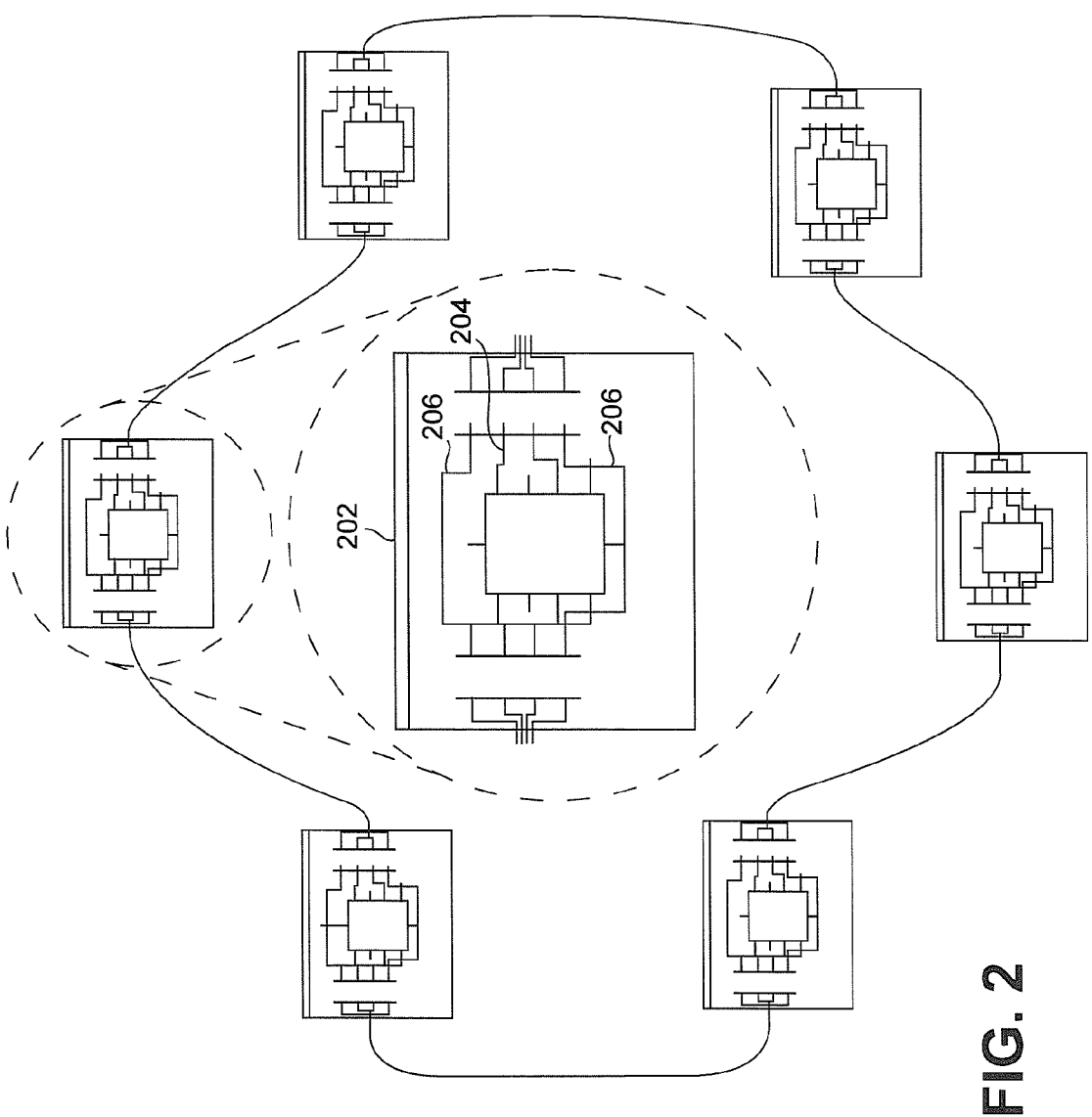
FIG. 2 is a block diagram of one exemplary embodiment of wiring in a braided-ring network topology.

As the name suggests, the BRAIN is built upon a braided-ring topology that augments the standard ring topology with increased connectivity. An exemplary braided-ring topology 100 is shown in FIG. 1. In braided-ring topology 100, each of a plurality of nodes 102-1 . . . 102-N (also labeled as nodes A-F in FIG. 1) is coupled to neighboring nodes via direct links 104. In addition to neighboring connections, each node 102 is also connected to its neighbor's neighbor via a link called the braid or skip link 106. One exemplary embodiment of wiring the BRAIN is shown in FIG. 2, where the skip links 206 are routed via the nearest neighbor links.

In the embodiment of FIG. 1, the BRAIN is implemented as a flooding network, as opposed to a store-and-forward network. That is, each node 102 of the BRAIN does not wait for the entire message prior to forwarding the message as in a store-and-forward network. Hence, inter-node propagation delay is minimal, comprising only a few bits delay for each hop. As used herein, a hop refers to the transmission of data from one node 102 to another node 102. For protocols such as TTP/C and FlexRay, the BRAIN can be viewed as a logical bus from a protocol perspective. Forming a bi-directional ring, the BRAIN offers two channels, directions of availability, and multiple mechanisms to augment data integrity. For example, in some embodiments, data is propagated in a first direction 108 through direct links 104 and in a second direction 110 through skip links 106. Additional details regarding the mechanisms to augment data integrity can be found in the '305 application.

Guardian capability is incorporated into the BRAIN architecture via a Brother's Keeper Guardian physiology, where nodes 102 guard their geographic neighbor nodes. Additional details regarding the guardian functionality are described in the '936 and '931 applications. In synchronous operation, the nodes adjacent to the currently-scheduled transmitter implement guardian enforcement actions, thus the guardian can be pictured as moving around the ring as the TDMA communication sequence progresses. The policies enforced by the guardian circuitry can vary dramatically depending upon protocol requirements and assumptions. Since, in some embodiments, the BRAIN topology enables the implementation of the guardian on board the same silicon as the communications controller, it is possible for the guardian to leverage the protocol state information maintained by the controller. Therefore, the guardian behavior can include intelligent, complex, fault-containment strategies, for example the enforcement of protocol semantic state correctness. For protocols such as IEEE 1394, such guardian action also comprises the enforcement of start of frame (STOF) frame source or message identification polices. Note that the geographic relation of the guardian ensures that guardian action is fully independent, even if it is embodied into the communications controller hardware.

With such a guardian strategy, conventional limitations on slot order and slot size for protocols such as TTP/C and FlexRay are conceptually removed, in some embodiments, since these limitations were initially included to support simplistic local guardian deployment. Using the Brother's Keeper guardian strategy, the central guardian overheads now required by such protocols can be removed, and the cost savings of an integrated controller guardian can be realized, without a loss of guardian integrity.

The guardian strategy described above is sufficient to ensure that the nodes scheduled to transmit do not introduce erroneous messages into the system. In addition, the BRAIN incorporates additional high-integrity data propagation mechanisms to protect against faults injected downstream of the guardian nodes. As described in the '305 application, as data propagates around the ring, each node is monitored for correct data propagation by the next node downstream through bit-for-bit comparison between the data received on the direct and the skip link. Data corruption is signaled to nodes downstream with special integrity fields in the data flow or indicated via truncation (for example, truncation before the CRC is propagated). The precise action depends on the configuration of the ring (full-duplex or half-duplex links), the host protocol properties and framing, and fault tolerance level that is to be achieved. Because data flows in two directions, each node receives correct data despite any arbitrary or even malicious single point failure. To tolerate multiple faults, each receiving node compares data received from two directions and accepts data if it is bit-for-bit identical—even if it is not signaled with inline high data propagation integrity (integrity reconstitution). Hence, some embodiments are tolerant to multiple benign faults with high integrity.

With point-to-point links, the BRAIN architecture can tolerate complete loss of communications at any single geographic location on the ring. Similarly, a node may drop out from the ring and the system will remain operational with integrity guarantees intact. The point-to-point connectivity also mitigates physical layer composibility of a shared medium bus topology. Additionally, in a BRAIN topology, the physical medium can change between ring segments. Thus, long segments or segments subject to harsh EMI, HIRF, and cross-talk requirements may be made optical without forcing the costs of the optical links to all systems nodes.

Additionally, the physical routing of skip links can be in the same shield as the direct links and, in some embodiments, provided via the neighboring boards, resulting in simple physical ring-like architectures from a cabling perspective as indicated in FIG. 2.

Figure 3:
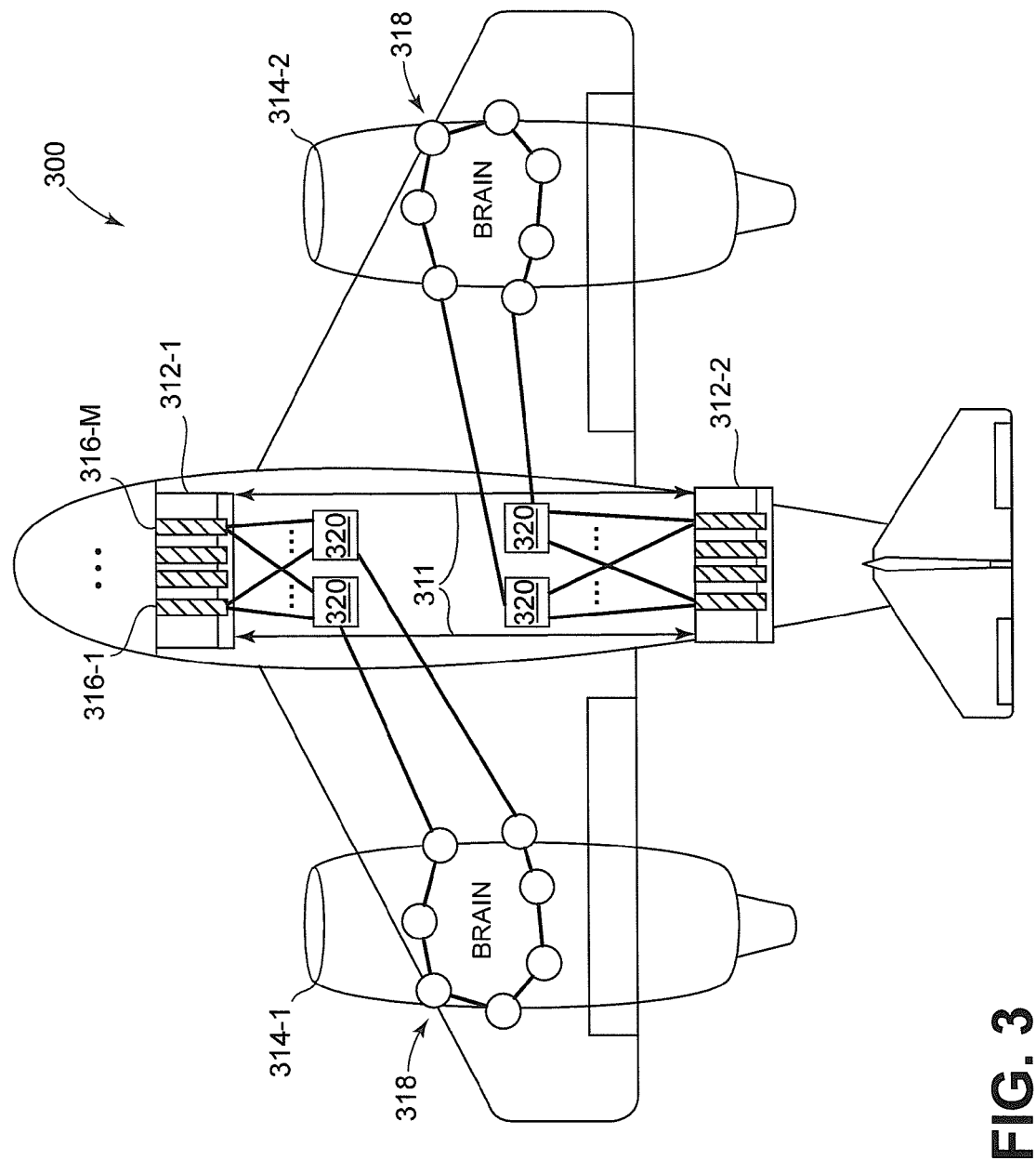
FIG. 3 is a diagram of one embodiment of a distributed control system in an aircraft.

The principal mechanisms of the BRAIN are largely protocol-agnostic and equally applicable to protocols such as FlexRay, TTP/C, and IEEE-1394, etc., as discussed above. To illustrate the fusion of BRAIN and Ethernet, an exemplary architecture is shown in FIG. 3.

In this exemplary architecture, high-performance computation of control and prognostics functions have been removed from the engine 314 and reside inside generic modular integrated avionics computational resource cabinets (IMA) 312. For increased availability and zonal fault tolerance the IMA 312 is redundant, in this embodiment, and placed at separate positions in the airframe (for example, IMA 312-1 in forward electronics bay and IMA 312-2 in aft electronics bay). Leveraging the independence in this exemplary embodiment, each engine 314-1 and 314-2 is controlled via the resources of separate cabinets 312-1 and 312-2, thus any failure of a single cabinet 312 cannot impact both engines 314-1 and 314-2.

For increased fault coverage and simpler system level redundancy management, the computational cards 316-1 . . . 316-M in IMA 312 of this example architecture are self-checking and fail-passive in nature. The interface into the dedicated computation cards 316, in this embodiment, is Gbs TTEthernet. In the example architecture shown in FIG. 3, each IMA cabinet 312 is an independent time-triggered Ethernet synchronization domain where computational tasks are aligned with IO resources in accordance with the TTEthernet communications schedule. Each cabinet 312 is, therefore, conceptually independent and communications between the cabinets 312 is implemented via links 311 using loosely coupled asynchronous (ARINC 664) messaging, in this embodiment. This path may also be used for cross-engine data exchange. Notably, although cabinets 312 are asynchronous in this exemplary embodiment, it is to be understood that, in other embodiments, cabinets 312 are synchronous.

Figure 4A:
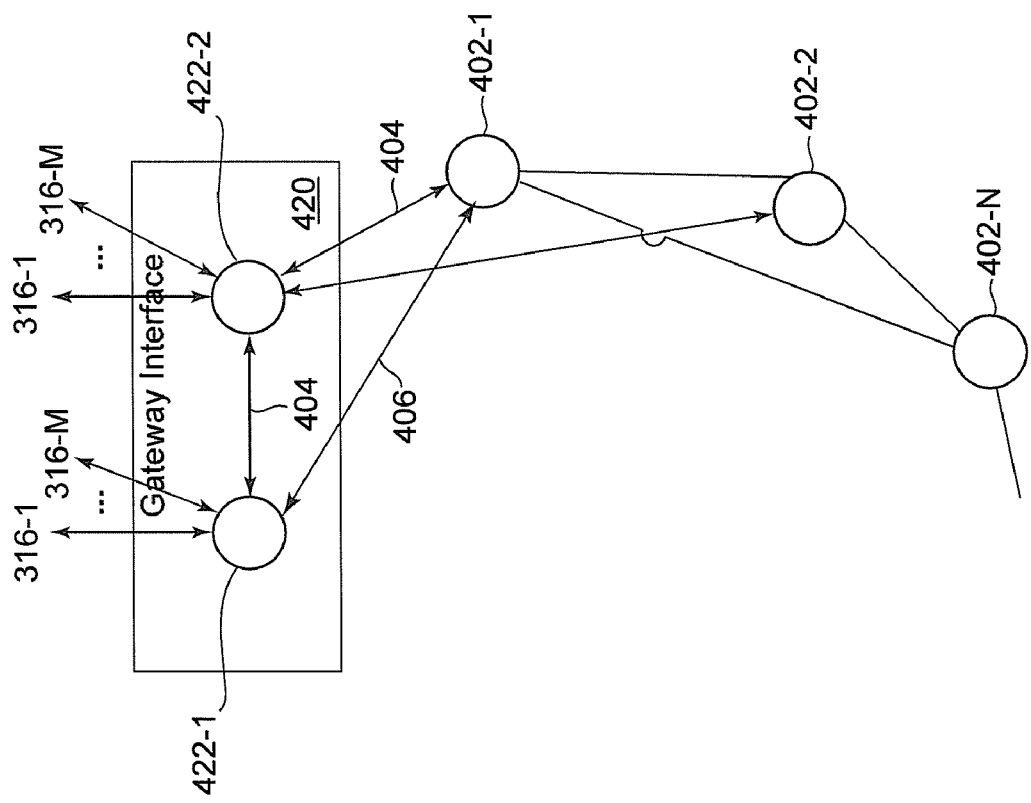
FIGS. 4A-4C are diagrams of embodiments of exemplary configuration of gateway interfaces in a braided-ring network topology.

The connectivity between the computational cards 316-1 . . . 316-M and the on-engine communications segments 318, in some embodiments, is via gateway interfaces 320 (also referred to as an internetworking device). The communications segments 318 are implemented using the BRAIN described above. Exemplary configurations of a gateway interface 420 shown in FIG. 4. Gateway interface 420 in FIG. 4 is comprised of two gateway nodes 422-1 and 422-2 which form a self-checking pair. The gateway interface 420 uses a direct link 404 to exchange and agree on messages it sends into the BRAIN and on messages it receives from the BRAIN. Hence, in some embodiments, the gateway interface 420 buffers and accepts messages from a higher bandwidth domain and sends these messages into the BRAIN using the self-checking pair (SCP) configuration.

In other embodiments, the bandwidth of the BRAIN matches the bandwidth of the network coupled to the BRAIN via the gateway interfaces 420. In some such embodiments, the gateway nodes 422-1 and 422-2 forward received messages in real-time. Hence, in such embodiments, little to no delay in message transmission is inserted by the gateway nodes. Furthermore, in some embodiments, the gateway nodes 422-1 and 422-2 are configured to perform protocol conversion in order to convert the message protocol of the external network coupled to the BRAIN (for example, the message protocol of the IMA 312) into the message protocol used by the BRAIN. Using the configuration shown in FIG. 4, the BRAIN is able to connect directly to a plurality of computational clients or cards 316-1 . . . 316-M via the gateway interface 420 (that is, several nodes outside the BRAIN connect point to point to the gateway).

In addition, in some embodiments, the gateway nodes 422-1 and 422-2 perform a voting function to agree on the value they will send into the BRAIN. Hence the data from the "back hosted" nodes (that is, outside the BRAIN) can be sourced from simplex nodes, voted and/or selected, and agreed between the two gateway nodes 422-1 and 422-2 and then sent into the BRAIN as bit for bit identical values. Thus, the buffering action for each gateway node 422, in some such embodiments, is 1) accept a message from high bandwidth port; 2) agree on the message with the other gateway node (for example, through voting function); 3) store the message until scheduled transmission; and 4) send the message into the BRAIN using BRAIN self-checking pair.

In the reverse direction a similar action is performed. In particular, each gateway node 1) receives a message from the BRAIN; 2) uses BRAIN's high integrity data propagation mechanisms to verify integrity of the message; 3) exchanges and agrees on the integrity of the received message with the other gateway node; and 4) sends the agreed message up to host nodes.

Figure 4B:
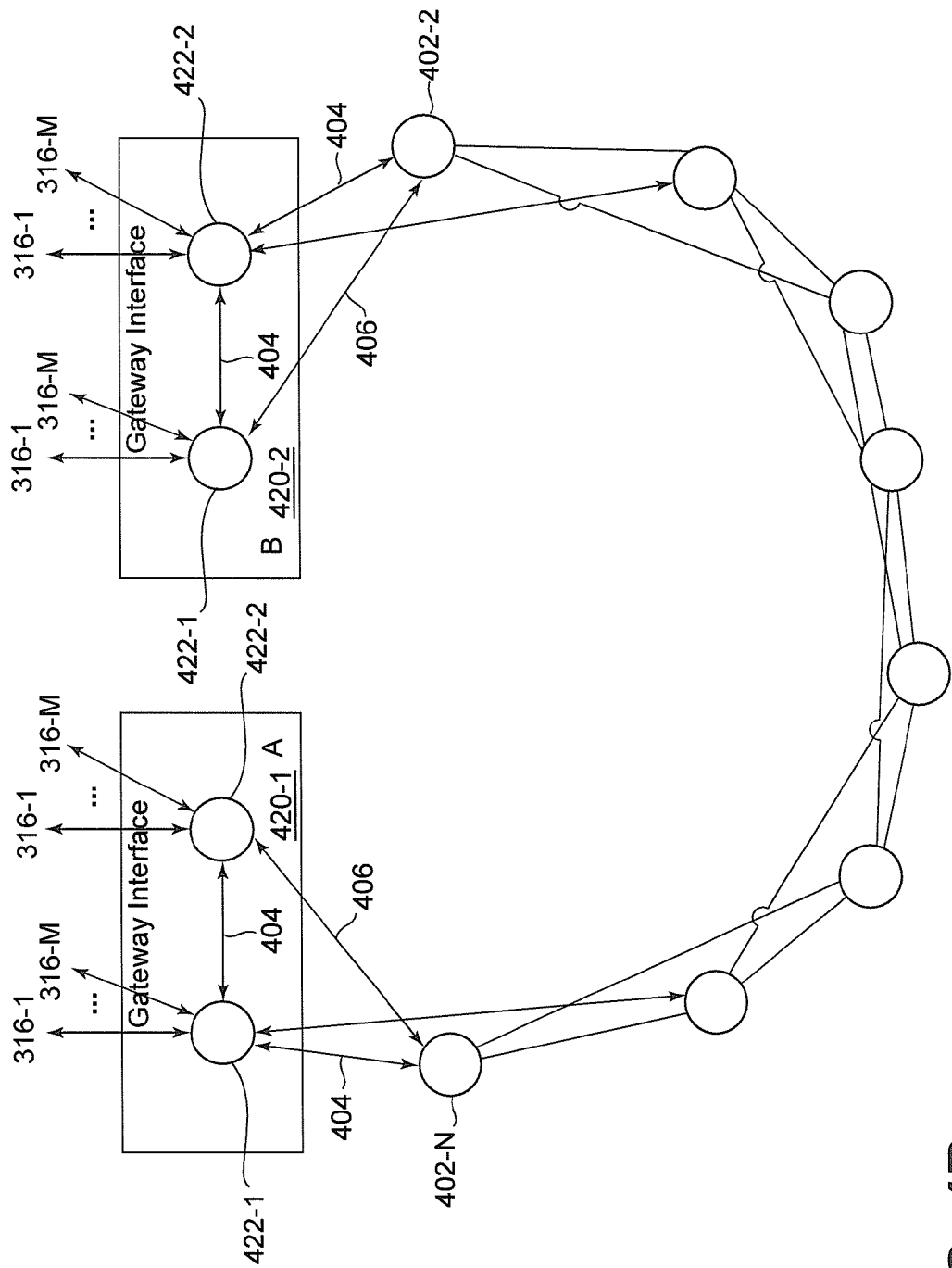
Figure 4C:
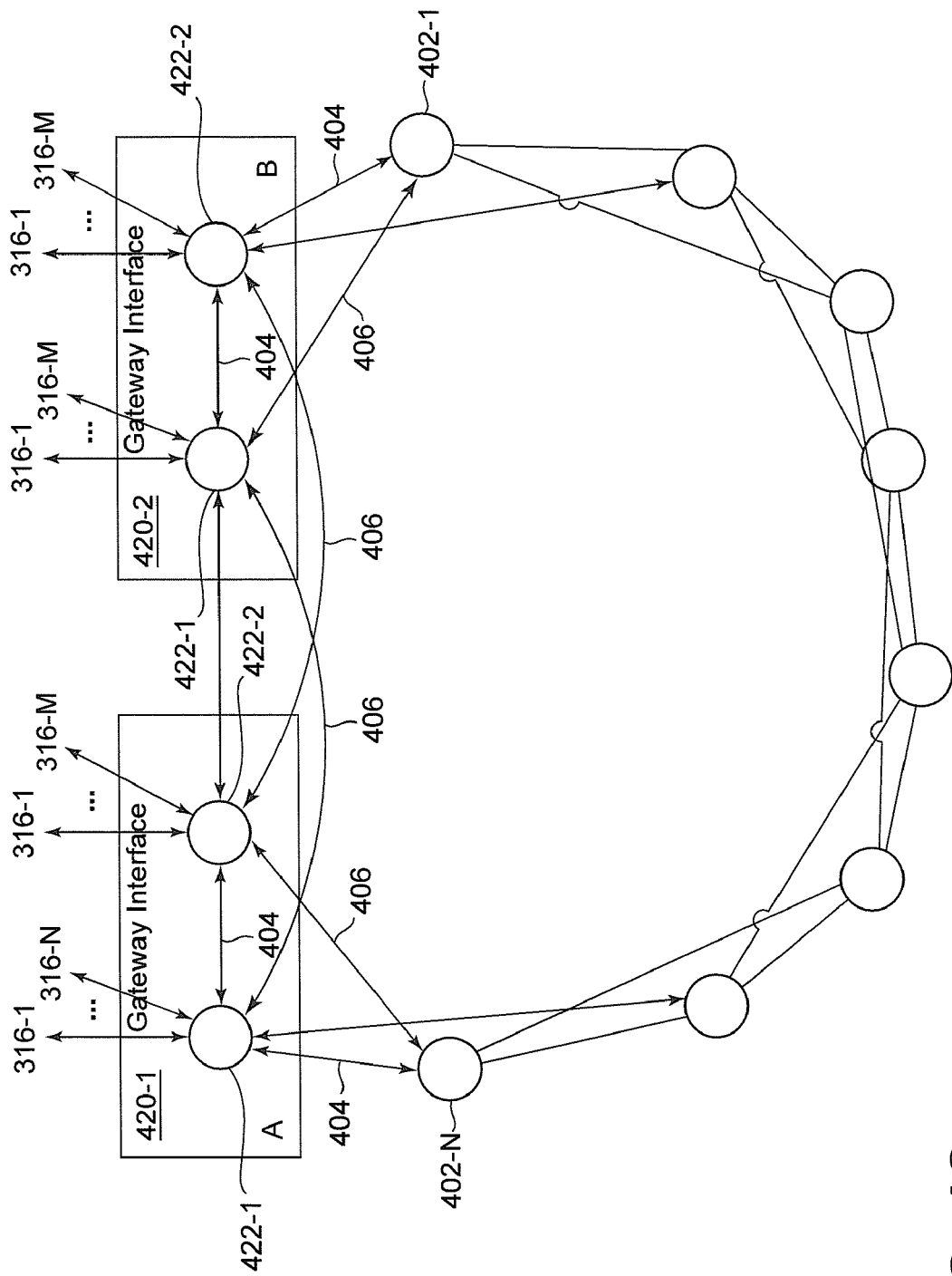

The BRAIN uses an internetworking device comprising two gateway interfaces 420-1 and 420-2 which function as a link for lane A and lane B connections as shown in more detail in FIGS. 4B and 4C. (see FIGS. 7A and 7B below for additional details). As shown in FIG. 4B, the interface function into the BRAIN has been split from one gateway interface into two gateway interfaces 420-1 and 420-2 each comprised of two gateway or interface nodes 422-1 and 422-2 acting as a self-checking pair. Thus, if connection through one of the gateway interfaces 420-1 and 420-2 is lost, the BRAIN nodes 402 are still available through the other gateway interface.

Similarly, as shown in FIG. 4C, the interface function into the BRAIN has been split between two gateway interfaces 420-1 and 420-2 (also labeled as gateway interfaces A and B). However, in the example in FIG. 4C, the two gateway interfaces 420-1 and 420-2 are connected using the self-checking action of the BRAIN. In particular, the gateway nodes 422-1 and 422-2 of gateway interface 420-1 are coupled to the gateway nodes 422-1 and 422-2 of interface 420-2 using direct links 404 and skip links 406. By completing the ring of the BRAIN through the gateway interfaces 420-1 and 420-2, the ability of individual nodes 402 to perform integrity reconstitution is improved. This is due to the transmission of data in both directions around the BRAIN. Additional details regarding integrity reconstitution are described in the '305 application.

From an architectural perspective, both gateways interfaces 420-1 and 420-2 (lane A and lane B connections) are synced to a common time base, hence each can transmit in accordance with an agreed upon schedule. This then enables the use of either half-duplex links or full duplex links.

Since the gateway nodes 422-1 and 422-2 in each gateway interface 420 form a self-checking pair, they can source the timeline for the BRAIN segments, in some embodiments (see the '450 Application for more details). Hence, the timeline of the BRAIN segments is configurable to be aligned with the time line of the hosted nodes outside the BRAIN. For example, in some embodiments, a simple master-slave sync in the context of simple connected hosts is used. In addition, in some embodiments, the gateway interface 420 sources the timeline up to the hosted computation nodes outside the BRAIN. For example, this would be useful when the hosted nodes are recovering from a transient error and need to re-sync.

Alternatively, the gateway interface 320 can be implemented, in some embodiments, using TTEthernet COM/MON switches as shown in FIGS. 5A-5C. FIGS. 5A-5C depict various configurations of switch boards 534 which include interface nodes 522-1 and 522-2 and COM/MON ICs 526 and 528 which are discussed in more detail in FIG. 6 below. In the example shown in FIG. 5A, the bandwidth conversion may be performed in the COM IC 526 and MON IC 528 or in the BRAIN interface nodes 522-1 and 522-2. The link 504 between the two BRAIN interface nodes 522-1 and 522-2 is used for input congruency exchange before the data is passed to the COM IC 526 and MON IC 528. The BRAIN interface nodes 522-1 and 522-2 operate as a BRIAN based self-checking pair (SCP).

In the example shown in FIG. 5B, each of the BRAIN interface nodes 522-1 and 522-2 is incorporated into one of the COM IC 526 and MON IC 528. In such a case, the high-bandwidth COM/MON IC congruency exchange link 530 is used to exchange and agree the frames input frame content. For Egress COM IC 526 and MON IC 528 connect different inputs to the 1st BRAIN node 502-1.

In the example shown in FIG. 5C, the fail passive nature of the COM/MON IC pair is leveraged, where MON IC 528 monitors the output from COM IC 526 and compares it against its expected output. In particular, COM IC 526 provides its output to a switched buffer 532 and to MON IC 528. If the output from COM IC 526 matches the expected output, MON IC 528 provides a signal to buffer 532 which enables buffer 532 to provide the output from COM IC 526 to nodes 502-1 and 502-2. In particular, the output is provided from buffer 532 to node 502-1 on both its skip link 106 and its direct link 504. In the case of an error MON IC 528 truncates the messages during transmission via a switched buffer 532 or some other physical layer interruption method. In such a configuration, a single output from COM IC 526 and MON IC 528 may be connected to both skip and direct links of the 1st BRAIN node 502-1. Input congruency would be performed as in FIG. 5B, that is, at the upper level via high speed data exchanged via the input congruency links of the COM IC 526 and MON IC 528 switching hardware.

TTEthemet provides backward compatibility with existing avionics standards ARINC 664 (at layer 2), while augmenting the services to support true real-time, time-triggered message exchange. It therefore offers similar real-time performance to other Ethernet protocols mentioned above. However, TTEthernet protocol also offers improved fault tolerant synchronization start-up and error recovery algorithms. In addition, to address scalability, TTEthernet also provides the ability to support multiple independent synchronization domains and thus enables the hosting of independently synchronized distributed sub-systems. Since TTEthernet uses a standard frame format (which can be compatible with ARINC-664) for all messages, communication between independent synchronous domains and asynchronous network clients is implicitly provided via normal TTEthernet switching action.

Figure 6:
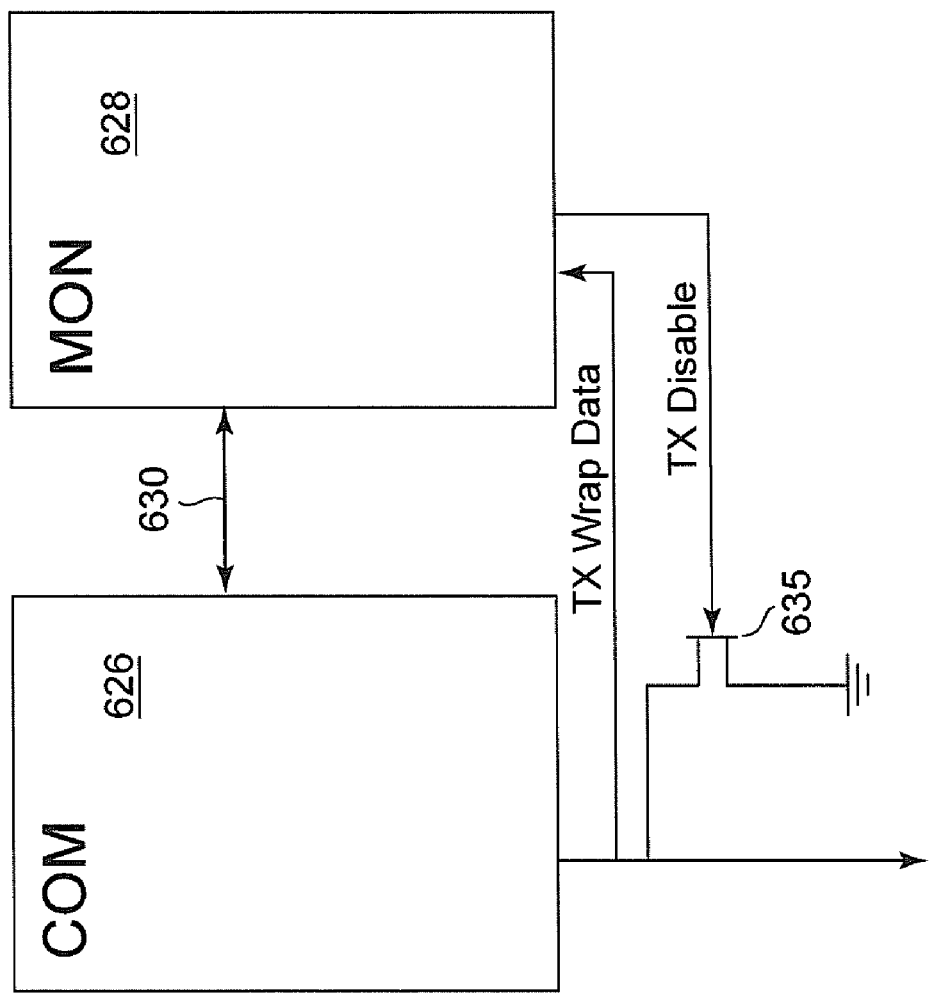
FIG. 6 is a diagram of one embodiment of a command/monitor (COM/MON) component configuration.

TTEthernet also mitigates the complex failure modes of the switching action by incorporating high-integrity self-checking command/monitor (COM/MON) component configurations as indicated on FIG. 6. In such a configuration, the MON IC 628 monitors the output of the COM IC 626 and any disagreement in expected output results in a disabling of the Tx Path, before the message completes. In particular, the data output by MON IC 628 is wrapped to MON IC 628. If the output data does not match the expected output, MON IC 628 sends a signal to a switch 635 which shorts the transmission path to ground and prevents transmission of the output data from completing. Hence, to all nodes receiving the output data, the data is either good or a detectable fault.

To prevent erroneous input into the pair from impacting pair agreement, the COM/MON configuration also introduces input congruency exchange 630 where input validity of each input frame is exchanged and agreed between COM IC 626 and MON IC 628. TT-Gigabit Ethernet (TT-GbE) also facilitates self-checking configurations for end-system components. The near full fault coverage of the self-checking component configurations presents a validated fail-silent fault model. Such a model can be used to simplify application redundancy management schemes, since all data sourced from such modules is either good to detectably faulty. Although, the TTEthemet self-checking switches are described herein, it is to be understood that, in other embodiments, other internetworking devices which provide similar error detection and fault tolerance while converting between protocols and/or bandwidths can be used. With respect to timeline, in the context of a TTEthernet system where the computation is hosted remotely via a switched network, the gateway nodes (for example, nodes 522-1 and 522-2) may execute the TTEthemet sync algorithm.

To realize real-time high speed control, communication from hosted nodes (for example, computational cards 316) to BRAIN node segments (for example, segments 318) through gateway interfaces (for example, interface 320) is time-triggered in some embodiments and, therefore, deterministic in nature. The gateway interfaces are fully schedule aware and enforce, buffer, and dispatch messages in accordance with the time-triggered communications schedule. The buffering action of the gateway interfaces 320 also serves to decouple high bandwidth computational resources of the computational cards 316 from the lower bandwidth on engine network segments 318. Although resources of computation cards 316 are higher bandwidth than the resources of on engine network segments 318, in this exemplary embodiment, it is to be understood that other embodiments can be implemented differently. Similarly, it is to be understood that the gateway interfaces need not be implemented as time-triggered interfaces in other embodiments.

In the exemplary architecture of FIG. 3, the on-engine network segments 318 are implemented using a lower bandwidth 10 Mbs full-duplex BRAIN-based Ethernet and the network of the computational cards 316 in IMA 312 are implemented using higher bandwidth TTEthemet. Since both the BRAIN and TTEthemet are time-triggered, the timeline of the BRAIN-based communication segments 318 can be driven by the high-integrity computational timeline of the IMA 312, and thus asynchronous boundaries and oversampling are avoided. Due to the decoupling action of gateway interface 320, the high-integrity computational cards 316 do not need to be aware of the lower bandwidth BRAIN constraints because everything is abstracted to a time-triggered Ethernet message.

In addition, since TTEthernet switches, such as switches 534, used in gateway interfaces 320 also incorporate time-triggered buffering and time-triggered store-and- forward action; the communications schedules of the high performance nodes 316 may be further decoupled from the on-engine communications segments 318, in embodiments using the TTEthernet switches. This enables changes to the IMA 312 (for example, processor upgrades, new applications added, etc.) to be made without impacting the on-engine behavior. Since the entire schedule is time triggered, in this embodiment, with a common timeline across both high-performance and on-engine segments, this flexibility is achieved without any loss in real-time control performance.

As used herein, "high performance nodes" are nodes which operate at higher speeds, higher memory usage, etc. than low performance nodes. For example, in the embodiment described below, high performance nodes are nodes containing control logic and low performance nodes are sensors and/or actuators.

The protocol implemented on the BRAIN-based segment 318 may be simple Ethernet, that is, simple message flooding. Alternatively, if bandwidth is very scarce, a variant of the EtherCAT register insertion scheme could be used. That is, nodes 302 modify a packet in real-time as it is forwarded on the network. In other embodiments, other protocols are implemented on the BRAIN-based segment 318. In any case, the integrity of the data during transport is protected by the BRAIN high-integrity data propagation mechanisms. In this exemplary architecture, BRAIN based on-engine nodes 302 are considered simple slaves to IMA computation cabinets 312. Since all data on the network is sourced and relayed in a high-integrity manner, the on-engine nodes 302 can be greatly simplified, in some embodiments, adopting a pick-first valid data selection algorithm in place of voting, etc. Thus, they may be realizable with a hardware-only implementation with minimal processing overhead.

Figure 7A:
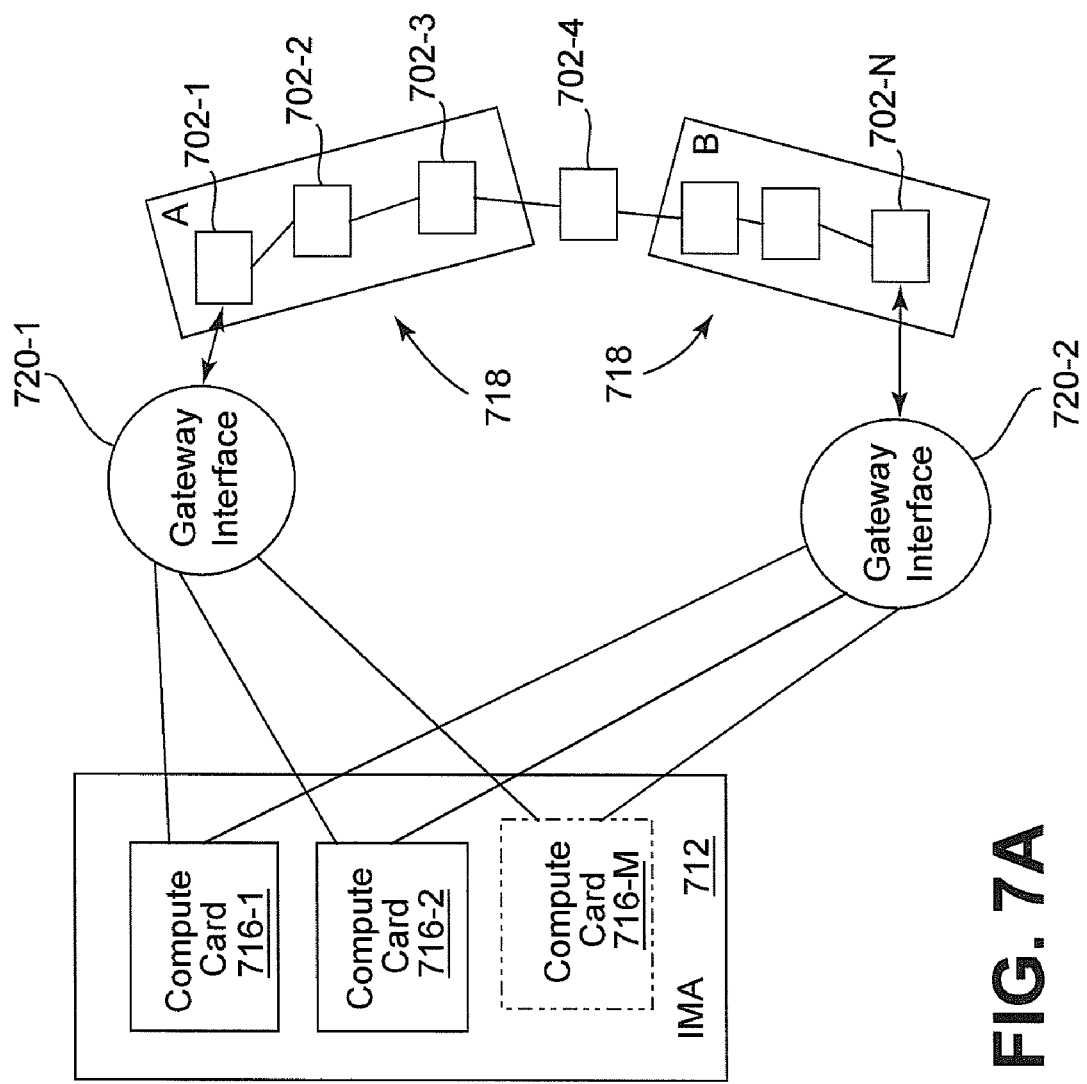
FIGS. 7A-7C are diagrams of exemplary embodiments of distributed control system.
Figure 7B:
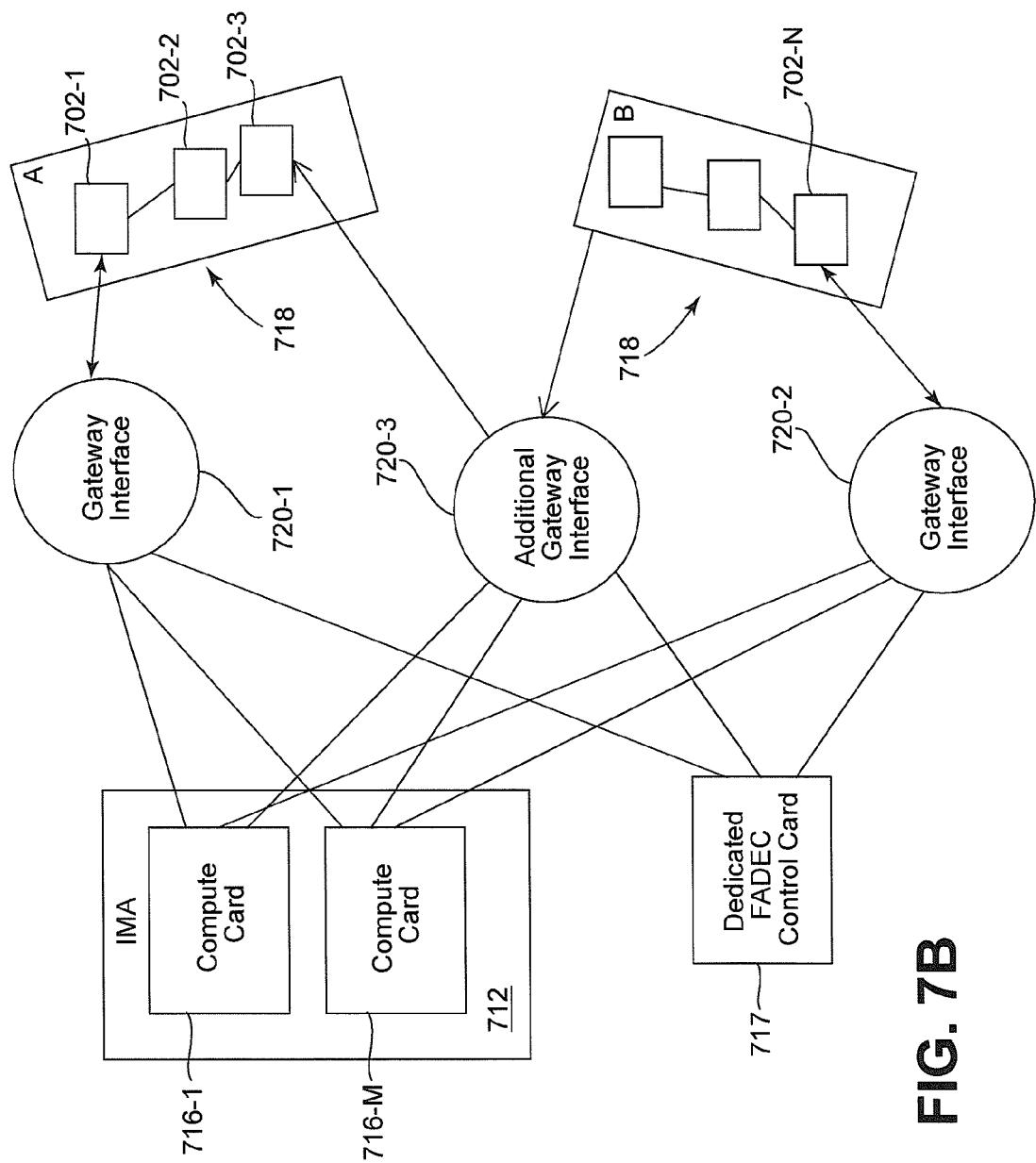

Furthermore, as shown in FIGS. 7A and 7B, some embodiments enable the on-engine network 718 to be a "single network" but keep dual lanes/channels independent with respect to failure. In particular, the lanes A and B are arranged as contiguous neighbors on the ring. Hence, the system can tolerate a failure and keep the control running. For example, if all the hardware for one lane is removed (such as due to failure), the high integrity control path is still available from one of the sides (SCP gateway nodes).

Thus, some embodiments enable support of two lanes for control availability as in conventional FADEC systems while enabling independent lanes/channels with respect to failure. For example, if a sensor is bad on channel A and a replicated sensor is available on channel B, while channel B has a bad CPU and channel A has a good CPU, some embodiments enable the use of the working hardware to withstand the fault. That is, the replicated sensor on channel B and the good CPU on channel A are used together to withstand the fault. In addition, use of sensors which do not require a dual or replicated configuration (for example, node 702-4) is also supported through such embodiments.

Note, as illustrated in FIG. 7A, the architectural layout in this example still maintains the availability of the dual lane/channel control, since the channel hardware is consolidated with inline elements. Hence, a failure in one channel does not impact the failure of the other. However, all sense and control data is available on a single network, in some embodiments. The mechanisms of the BRAIN prevent fault-propagation outside the lane boundary, and although the two lanes are conceptually integrated into a single network segment, the mapping of the lane-based hardware to separate segments of contiguous neighbor nodes supports segment failure independence. This mapping can be extended to more than 2 lanes.

In relation to scalability and processing performance, the exemplary architecture shown in FIG. 7A allows computational power to be added without impacting the on-engine segments 718. For example, to improve system availability, additional computational node 717 and gateway interface 720-3 are added into the exemplary architecture as illustrated in FIG. 7B. The additional computational resources can be high-performance computational resources dedicated to engine control computations, in some such embodiments.

Additionally, the self-checking pair provisions of the BRAIN can be used, in some embodiments, to compose commercial off-the-shelf (COTS) CPUs into high-integrity self-checking computational pairs to provide reversionary /supplemental back-up control. In such a configuration, conventional unmodified COTS CPUs can realize the high-integrity computational function with little to no software and hardware overheads.

Figure 7C:
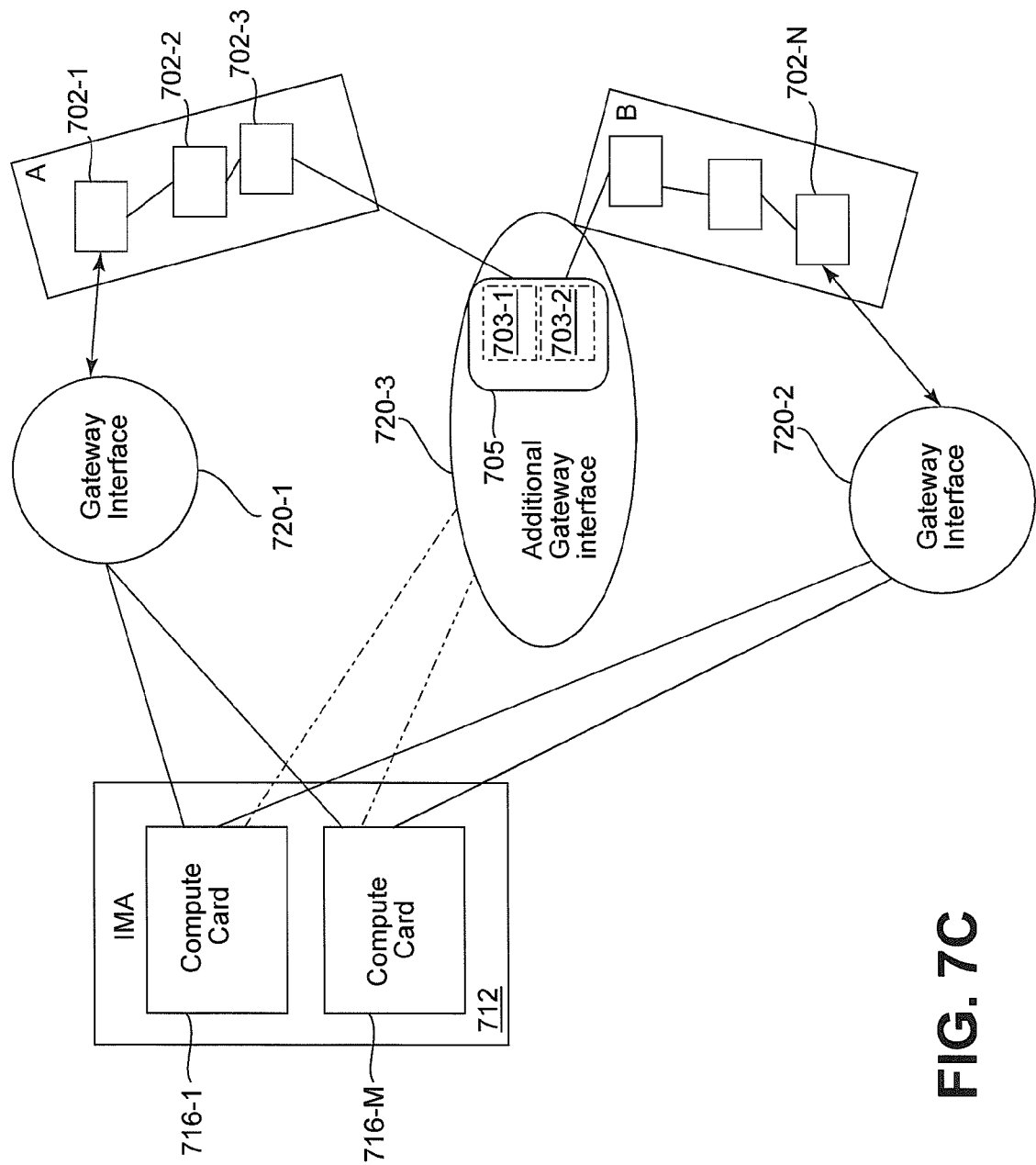

For example, as indicated in FIG. 7C, backup "reversionary control" gateway interface 720-3 is placed between the two lanes A and B of BRAIN based on-engine nodes 702. Gateway interface 720-3 includes nodes 703-1 and 703-2. Nodes 703-1 and 703-2 are a self-checking pair which together form the reversionary control unit 705 that performs control functions in the event IMA 712 fails. From such a location gateway interface 720-3 has full access to both channels of the FADEC independently and all sensor data. This has the advantage that the IMA 712 may cease operating in its entirety and the engine still performs without interruption. Such a strategy is also useful for engine maintenance, allowing engines to power-up independent of the IMA platform. Note that this hybrid architecture is supported by simple priority-based synchronization and clique aggregation protocols of the BRAIN where the start-up and recovery of timelines can be biased and prioritized for key specific nodes. Additional details regarding the priority-based synchronization and clique aggregation protocols of the BRAIN are described in the '450 application.

For larger engines, additional simplex or self-checking computational elements may be added to the network for localized distributed control. It should also be noted that in addition to self-checking configurations, the BRAIN also enables three adjacent nodes to be configured into a TMR computational set as described in the '343 application. Hence, variants on the embodiments described herein are also contemplated. Additional ring loop backs and cross channels in on-engine segments (for example, segment 318) are also possible. Simplex non self-checking compute nodes may also be used within the BRAIN segments to implement additional compute functions.

Figure 8:
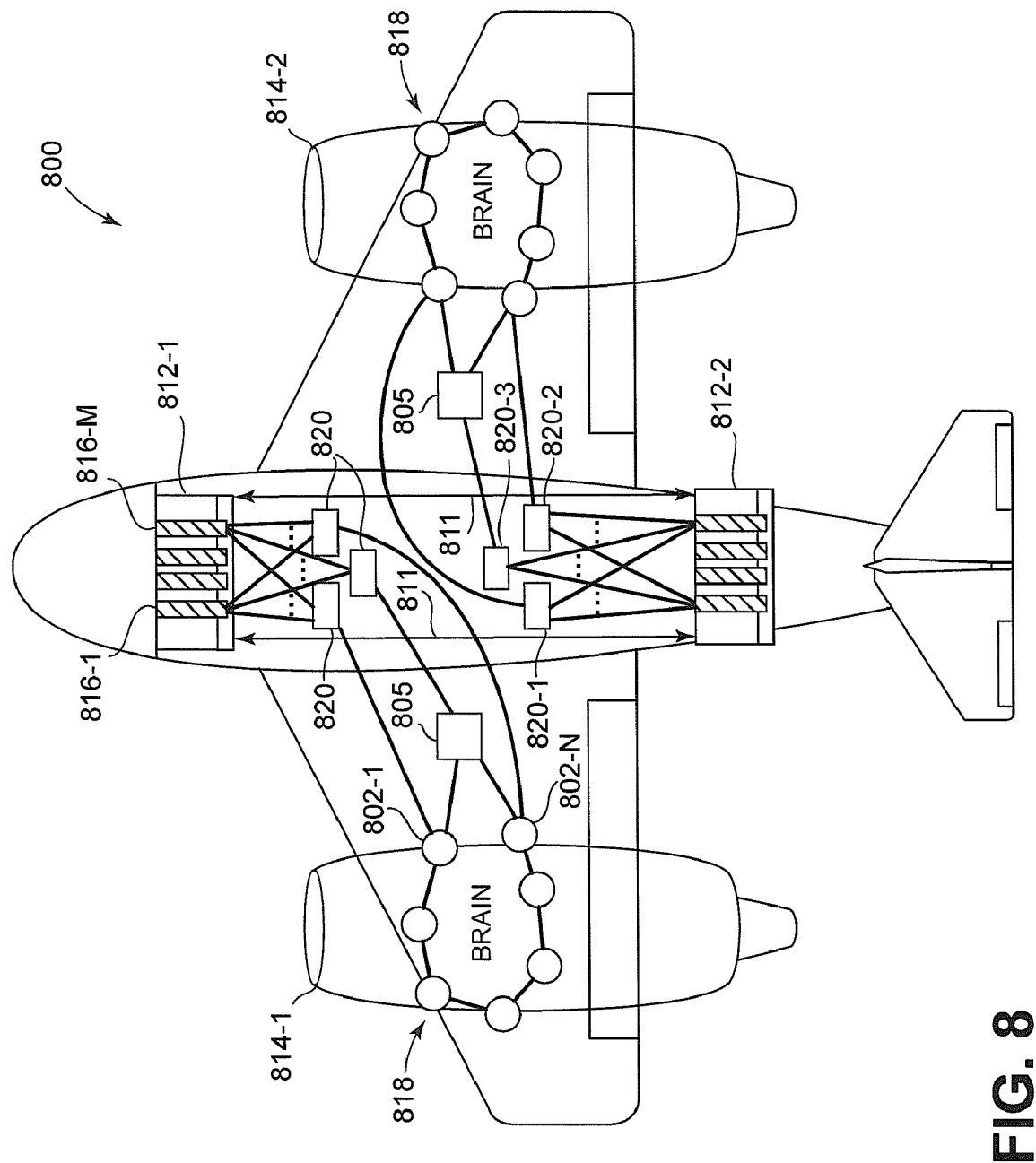
FIG. 8 is a diagram of one embodiment of a distributed control system in an aircraft.

FIG. 8 depicts an exemplary application of the architecture described and shown in FIG. 7C. In particular, the embodiment shown in FIG. 8 includes, for each engine, three gateway interfaces 820 coupled to the on-engine nodes 802-1 . . . 802-N. In addition, network 800 includes a reversionary control unit 805 coupled between the on-engine nodes 802 and gateway interface 820-3. Reversionary control unit 805 can be located on-engine or off-engine. Similarly, reversionary control unit 805 can be co-located with gateway interface 820-3, as shown in FIG. 7C, or separately as shown in FIG. 8. Reversionary control unit 805 performs control functions in the event that IMA 812 fails. In particular, reversionary control unit 805 is operable to achieve standalone operation of engine 814 to support maintenance and independent power up without the computation cards 816-1 . . . 816-M in IMA 812. Accordingly, in some embodiments, reversionary control unit 805 is directly coupled to an input from a pilot. In such embodiments, reversionary control unit 805 need not be coupled to one of gateway interfaces 820.

In the exemplary hybrid TTEthernet BRAIN architecture embodiments discussed above, the distributed architecture is divided into high-performance and low-performance segments using a common communications protocol providing flexibility and scalability. The embodiments described above enable the high-temperature on-engine control segments to be optimized with respect to the constraints of the extreme on engine environment, however it does not limit the communications bandwidth of the high-performance computational backbone, where the requirements of reconfigurable control, and advance health monitoring may continue to increase demand. The integration of the high-performance computational platform within an IMA and the removal of the computation function from the on-engine system electronics provide increased reliability and life-cycle cost optimization. The investment in high-integrity compute hardware, and associated obsolescence management can then be amortized and managed at the airframe rather than remain a FADEC only expense. Similarly, airframe resources, such as cooling, etc., can be leveraged to improve computational hardware reliability. In addition, new functionality can be then added to the FADEC system without impacting the design of the on-engine segment.

Finally, utilizing the BRAIN's unique mechanisms for node pairing to configure high-integrity computational self-checking pairs, together with the BRAIN's advanced synchronization and start-up control primitives, enables the supplementing of the architecture with additional compute capability to implement reversionary back up control. This enables mitigation of the common mode dependency of the IMA integration. In addition it enables maintenance, etc. to be performed without the full IMA present. Other benefits, in addition to the savings of a common communications infrastructure, provided by the embodiments described above, include simplified loading, and test equipment strategies.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the embodiments described above. Therefore, it is manifestly intended that this invention be limited only by the claims and the equivalents thereof.

What is claimed is:

1. A distributed control system comprising:
   a first network section comprising one or more control nodes containing control logic operable to perform control function computations;
   a second network section, wherein the second network section comprises;
      a plurality of additional nodes responsive to the one or more control nodes in the first network section, each of the plurality of additional nodes communicatively coupled directly to two neighbor nodes and communicatively coupled directly to two skip nodes using a plurality of links;
      first and second gateway interfaces each coupled to the first and second network sections and each operable to interface the first network section to the second network section;
      wherein the first network section is operable to communicate signals using a first communication protocol; and wherein the plurality of nodes in the second network section are operable to communicate signals over the plurality of links using a second communication protocol that is different from the first communication protocol;
   the distributed control system further comprising:
      a third gateway interface coupled to the first network section; and
      a reversionary control unit coupled between the third gateway interface and the second network section, wherein the reversionary control unit is operable to control operation of the plurality of additional nodes if the one or more control nodes in the first network section fail.

2. The distributed control system of claim 1, wherein the total bandwidth allocated for the first protocol in the first network section is greater than the total bandwidth allocated for the second protocol in the second network section.

3. The distributed control system of claim 1, wherein the first protocol and the second protocol are based on Ethernet.

4. The distributed control system of claim 1, wherein the first network section is located away from an engine under control of the one or more control nodes in the first network section, and wherein at least a majority of the additional nodes in the second network section is located on the engine.

5. The distributed control system of claim 1, wherein the reversionary control unit comprises two nodes configured in a self-checking pair configuration.

6. The distributed control system of claim 1, wherein the reversionary control unit of is operable to achieve standalone operation of a controlled engine without the control nodes of the first network section.

7. The distributed control system of claim 1, further comprising:
   a third network section comprising one or more control nodes containing control logic operable to perform control function computations;
   a fourth network section comprising:
      a plurality of additional nodes responsive to the one or more control nodes in the third network section, each of the plurality of additional nodes communicatively coupled to two neighbor nodes and to two skip nodes using a plurality of links; and
   third and fourth gateway interfaces each coupled to the third and fourth network sections and each operable to interface the third network section to the fourth network section;
   wherein the third network section is operable to communicate signals using the first communication protocol;
   wherein the plurality of additional nodes in the fourth network section are operable to communicate signals over the plurality of links using the second communication protocol;
   wherein the third network section is coupled to the first network section; and
   wherein the first network section is operable to control operation of a first engine via the second network section and the third network section is operable to control operation of a second engine via the fourth network section.

8. The distributed control system of claim 1, wherein each of the first and second gateway interfaces comprises first and second gateway nodes coupled together via a direct link to form a self-checking pair, wherein each of the first and second gateway nodes is further coupled to one of the additional nodes via a skip link.

9. The distributed control system of claim 8, wherein each of the first and second gateway nodes in first gateway interface is coupled to each of the first and second gateway nodes in the second gateway interface such that the first and second gateway interfaces form a self-checking pair.

10. The distributed control system of claim 8, wherein each of the first and second gateway nodes are operable to forward received messages in real-time.

11. The distributed control system of claim 1, wherein the second communication protocol comprises one of Controller Area Network (CAN), Time-triggered Protocol (TTP/C), FlexRay, Intellibus, IEEE-1394, SAE 5643, ARINC 664, Ethernet Powerlink, EtherCAT, and Time-triggered (TT) Ethernet.

12. The distributed control system of claim 1, wherein the additional nodes in the second network section are configured to provide at least two independent lanes for communication signals.

13. The distributed control system of claim 12, wherein the second network section comprises at least two segments of contiguous additional nodes, each segment of contiguous additional nodes mapped to one of the at least two independent lanes.

14. The distributed control system of claim 13, further comprising a third gateway interface coupled to the first network section and to the second network section, wherein the third gateway interface is coupled to the second network section between the at least two segments of contiguous additional nodes.

15. An internetworking device for communicatively coupling a plurality of nodes in a first network to a second network external to the first network, each of the plurality of nodes communicatively coupled to at least one other node via a direct link and at least one other node via a skip link, the internetworking device comprising:
 a first gateway interface operable to couple the plurality of nodes to the external network, the first gateway interface comprising a first node and a second node of the plurality of nodes; and
 a second gateway interface operable to couple the plurality of nodes to the external network, the second gateway interface comprising a third node and a fourth node of the plurality of nodes wherein the first node is configured to communicate data in a first direction through the first network to a fifth node via a direct link and the second node is configured to communicate data in the first direction to the fifth node via a skip link; and wherein the third node is configured to communicate data in a second direction through the first network to a sixth node via a direct link and the fourth node is configured to communicate data in the second direction to the sixth node via a skip link.

16. The internetworking device of claim 5, wherein first gateway interface is coupled to the second gateway interface to form a self-checking pair.

17. The internetworking device of claim 15, wherein the first and second nodes in the first gateway interface are coupled together to form a self-checking pair; and the third and fourth nodes in the second gateway interface are coupled together to form a self-checking pair.

18. A distributed control system for controlling an engine comprising:
 a resource cabinet located off the engine, the resource cabinet comprising a plurality of computational cards, wherein the plurality of computational cards are operable to communicate using a first protocol;
 a plurality of on-engine components operable to communicate using a second protocol that is different from the first protocol, each of the plurality of on-engine components coupled to two neighbor on-engine components via direct links and to two skip on-engine components via skip links;
 a first gateway interface operable to couple the plurality of computational cards to the plurality of on-engine components and to convert between the first and second protocols; and
 a second gateway interface operable to couple the plurality of computational cards to the plurality of on-engine components and to convert between the first and second protocols.

19. The distributed control system of claim 18, wherein the plurality of on-engine components comprise at least two segments of contiguous on-engine components, wherein each segment of contiguous on-engine components is mapped to one of at least two independent lanes.

* * * * *

UNITED STATES PATENT AND TRADEMARK OFFICE
CERTIFICATE OF CORRECTION

PATENT NO. : 8,130,773 B2  
APPLICATION NO. : 12/407710  
DATED : March 6, 2012  
INVENTOR(S) : Hall et al.

Page 1 of 1

It is certified that error appears in the above-identified patent and that said Letters Patent is hereby corrected as shown below:

In the Claims

Claim 16, Column 14, Line 4, replace "The internetworking device of claim 5," with
--The internetworking device of claim 15,--

Signed and Sealed this
Seventh Day of January, 2014

Margaret A. Focarino
*Commissioner for Patents of the United States Patent and Trademark Office*